May 10, 1966  Z. A. TYPALDOS  3,250,216

AUTOPHAGE ROCKET

Filed Jan. 26, 1960

INVENTOR.
Zissimos A. Typaldos
BY S. J. Rotondi,
A. J. Dupont & E. C. Gott

# United States Patent Office 3,250,216
Patented May 10, 1966

3,250,216
AUTOPHAGE ROCKET
Zissimos A. Typaldos, Glendale, Calif., assignor to the United States of America as represented by the Secretary of the Army
Filed Jan. 26, 1960, Ser. No. 4,832
4 Claims. (Cl. 102—49)

The invention described herein may be manufactured and used by or for the Government for governmental purposes, without the payment to me of any royalty thereon.

This invention relates to power plants for incremental rockets. Such rockets are able to eject continuously during the powered flight at least part of their dead weight mass, and thus minimize the penalty of dead-weight mass that must be originally incorporated in any particular design.

The main object of this invention is to supply a power plant for a rocket that will take the place of certain items that are now considered indispensable in the overall mass load of a rocket.

It is a further object of this invention, by elimination of certain items, to reduce the ratio of overall mass load to payload, thus permitting the same load to go a greater distance, or inversely carry a much greater load an equal distance.

Such a power plant is the autophage which promises to extend the speed spectrum of rockets to hitherto unachievable values, and for the same initial acceleration the autophage becomes supreme with respect to other known power plants when made large enough.

The basic principle of the autophage power plant is the application of heat of propellant combustion to vaporize or burn the structure that becomes superfluous to the further progress of the flight. One of the fundamental concepts in the autophage principle is the consumption of the propellant container at the same time that the propellant itself is being consumed. This is accomplished by feeding the container into the engine. A sliding seal at the point of entrance of the container into the motor prevents the escape of the hot chamber gases produced by the propellant combustion and used to melt, evaporate, and burn the container. Certain other masses carried by conventional rockets are also greatly decreased or eliminated in the autophage, and only a small fraction of the structure or other superfluous mass remains to the end of the powered flight.

It is still another object of this invention to use inertial pumping to do most or all of the propellant pumping which leads to simplification as well as reduction in weight in view of the elimination of a separate auxiliary power plant.

The complete elimination or great reduction of the pumping plant is a second fundamental concept of the autophage principle. It is highly desirable when using liquid propellant to reduce or do away entirely with the mass of the propellant pumping plant, otherwise this auxiliary power plant would remain and increase appreciably the dead weight at burnout. This can be accomplished simply by using inertial pumping to do all or most of the required pumping.

In inertial pumping, the inertial reaction of the propellant, payload, and the structure forward of the motor is used to develop the pressure necessary to force the propellant and container into the combustion chamber. The autophage appears to be the first type of rocket for which pure inertial pumping may be applicable. Some inertial pumping does take place in conventional liquid propellant rockets, but the effect is inherently small and drops off rapidly as the flight progresses. In contrast, with the autophage motor, inertial pumping may be used to advantage throughout the period of powered flight.

An equal amount of work is required to pump the propellant when using inertial pumping as when using a more conventional pumping method. However, this work is performed by the thrust of the engine as it moves up on the propellant tube. The pumping power is the product of the force necessary to introduce the propellant in the combustion chamber multiplied by the velocity of creep of the motor up the tube. The pumping energy is derived ultimately from the propellant carried, but in the autophage the conversion of chemical energy to mechanical work is done with the high thermal efficiency of the main power plant.

Figure 1:
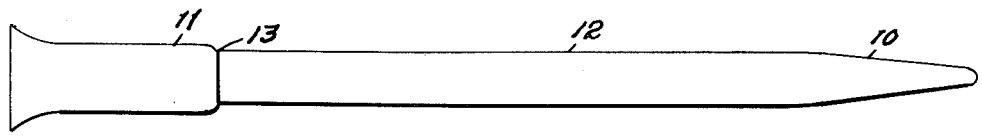
FIGURE 1 is a schematic view of an autophage before firing or in early stages of flight.

FIGURE 1 shows an autophage rocket in which 10 is the payload section, 11 is the casing for the rocket motor, 12 is the consumable propellant container connecting the payload 10 with the casing 11, and having a slidable pressure seal 13 where it joins the rocket casing 11.

Figure 2:
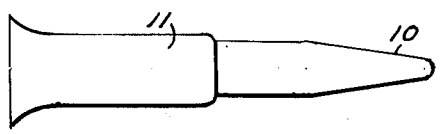
FIGURE 2 is a similar view of the autophage at burnout.

FIGURE 2 shows the rocket at burnout consisting only of the payload 10 and the rocket motor 11, the propellant 14 and the propellant container 12 having been consumed.

Figure 3:
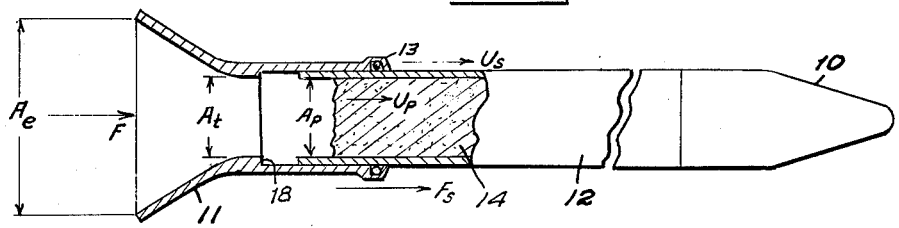
FIGURE 3 is a schematic diagram of a solid-propellant autophage partly in section with the propellant container in broken section as the length of container is actually much greater than shown.

In the solid propellant autophage shown in FIGURE 3, the burning surface is assumed to advance into the unburned propellant 14 at a constant velocity $U_p$. For end burning illustrated in this diagrammatic representation, the velocity $U_s$ of the tube feeding past the seal 13 would have to equal $U_p$ in order for the burning surface to remain stationary relative to the chamber 11. Some propellants do not have a sufficiently high burning velocity for use in end burning, and it is necessary to employ a more complex burning surface in which case $U_s$ can be many times greater than $U_p$. It is also assumed that the container 12 can be melted away and burned at the speed $U_s$. The motor 11 shown in FIGURE 3 is a straight-sided tubular motor, and the ratio of the chamber area $A_c$ to the throat area $A_t$ is one, i.e. the nozzle contraction ratio–$N_c$ is one. This type of chamber has certain advantages, but other chamber designs may be used.

Figure 4:
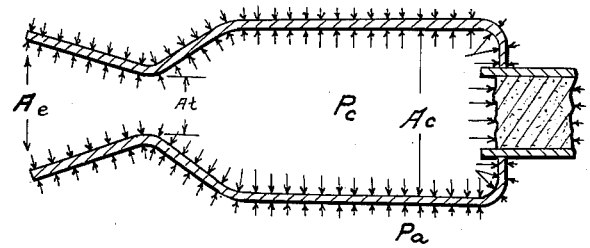
FIGURE 4 is a diagrammatic representation of the pressure distribution in an autophage motor.

As is well known, the thrust derived by a jet motor is due to the sum of forces acting on all surfaces. If the small forces due to viscous friction are neglected, then only the effect of the acting normal pressures need be considered. A typical pressure distribution for an autophage motor is shown in FIGURE 4. As indicated in this figure, the external or isostatic pressure $P_a$ is assumed constant over all the external surfaces and equal in magnitude to the hydrostatic pressure of the undisturbed surrounding atmosphere. This assumption is due purely to convention. By convention, if the atmospheric pressure is distributed differently than is shown in FIGURE 4, the increase in the force acting on the external surfaces is charged off to external drag.

Unlike the external pressure, the internal pressure does vary from point to point along the motor's inner surface. For a given motor configuration and a given propellant, it is found that conditions internal to the motor are unaltered by variations in the external pressure, provided that a certain pressure ratio has been exceeded. The pressure ratios of interest in practical applications have always been well above this minimal value. For pressure ratios above this minimum, it has been found that for a given motor and propellant, the integral of the pressure over the inner surfaces may be expressed as follows:

(1) $\quad F_\infty = C_{F_\infty} A_t P_c$ where $F_\infty$ is the net force acting on the internal surfaces, $A_t$ is the throat area and $C_{F_\infty}$ is a dimensionless coefficient, and $P_c$ is the mean absolute chamber pressure. To a close approximation $C_{F_\infty}$ is found to depend only on the motor design, the working fluid properties and the chamber pressure. However, with most systems the effect of $P_c$ on $C_{F_\infty}$ is negligible over a very wide range of pressures, including those of practical interest. $F_\infty$ and $C_{F_\infty}$ may also be interpreted as the thrust and thrust coefficient that would be measured if the motor were operated in a vacuum.

By the convention previously mentioned, the net thrust of the motor is obtained by adding to Equation 1 the total force due to the surrounding atmospheric pressure. With this addition, the formula gives the net thrust that is normally measured in the usual thrust-stand test. Clearly, if $A_e$ is the nozzle exit area, integration of $P_a$ over the external surface yields a net force $P_a A_e$ opposing $F_\infty$. The net thrust then is:

(2) $\quad F = F_\infty - P_a A_e = C_{F_\infty} P_c A_t - P_a A_e$

Equation 2 is usually implified to:

(3) $\quad F = C_F P_c A_t$ in which the last term of Equation 2 has been included in the thrust coefficient. Equation 3 rather than Equation 2 is commonly used to express F.

Assuming the vehicle of FIGURE 3 to be operating in a vacuum. The pressure acting on the external surface is zero so that no forces affecting the thrust can be contributed by this surface. Within the motor cavity, pressures do exist because of the action of the working fluid. However, if viscous friction is neglected, it is evident that no net force in the direction of the thrust can result from the straight-sided tubular portion of the chamber, for without friction, this fluid pressure is purely hydrostatic and the projected area of this surface in the direction of thrust is zero. However, in this direction of thrust, the projected areas of the propellant burning surface and of the expansion cone are not zero; and, therefore, thrust is generated at these surfaces by the hydrostatic pressure. The thrust derived from the former of this sources is clearly $P_c A_t$, since $A_E$ equals $A_t$ for the motor of FIGURE 3. Comparing this contribution with Equation 1 it is evident that the extent by which $C_{F_\infty}$ exceeds one is due to the additional thrust derived from the expansion cone surface. This additional thrust is in most instances a significant fraction of the total net thrust, and it follows from the above discussion that $C_{F_\infty}$ can never be less than one.

Relative thrusts of forward and after sections as shown in FIGURE 3, the after section consists primarily of a short and thin empty shell. The mass of this section is only a small fraction of the mass of the entire vehicle. This is clearly the case during the early portions of the flight when the forward section is large and filled with propellant. It is evident that the rather large thrust that acts directly on the expansion cone is sufficient to give to the small mass of the after section a much higher acceleration than can be imparted to the whole vehicle by the total net thrust. At least this is the case initially and during the earlier portions of the flight when the forward mass is large and the over-all acceleration of the vehicle low. To avoid having the after mass accelerate faster than the rest of the vehicle, it is necessary to transmit some of the thrust generated at the expansion cone to the forward mass. This is done by the force $F_s$ indicated in FIGURE 3. This force may be thought of as a frictional force suitably adjusted in value and acting between the after mass structure and the forward mass tube envelope. For example, the seal friction is part of $F_s$, but the seals would be insufficient by themselves to provide all of the required friction. It should be noted that as the forward mass diminishes, the value of $F_s$ will have to vary in order that the acceleration of the forward and after portions remain identical to each other and their relative velocity $U_s$ remains unchanged. Thus, it might be imagined that the force $F_s$ is caused by a brake mounted on the after section and suitably controlled to exert on the propellant tube the proper braking force, or by a simple mechanism such as the stop 18 which prevents the motor 11 from creeping up the tube 12 at a faster rate than the latter is consumed.

The tendency for the after section to advance on the forward section is seen to be a consequence of their relative thrusts, masses, and resulting accelerations. In particular, this pumping action may be thought of as a result of the high inertia and relatively low acceleration of the forward section. It is this inertia that generates the reaction necessary to force the forward section into the chamber in spite of the opposing chamber pressure; hence the term inertial pumping.

Figure 5:
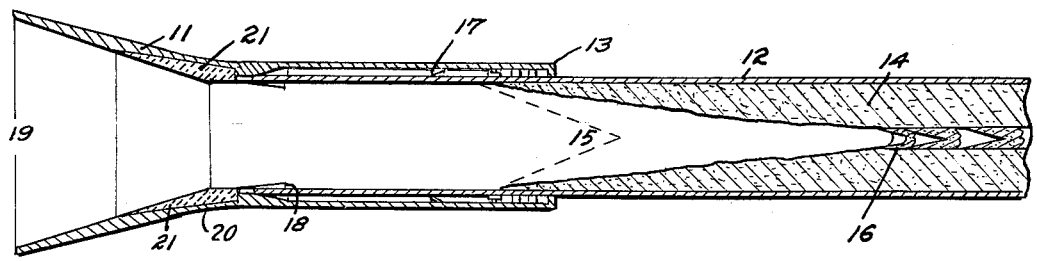
FIGURE 5 is a diagrammatic representation of an autophage motor showing the propellant partly consumed.

FIGURE 5 shows an autophage motor with a nozzle contraction ratio of one, during operation, in which the dotted lines 15 indicate the desired conical burning surface of the solid propellant. However, 16 is the igniter mechanism which actually burns as shown, the unburned propellant protecting the propellant container 12 which may be made of plastic, aluminum, copper, etc., as practically any material will be consumed once in contact with the hot gases.

A seal 13 consisting of two sliding cup-seals and a lubricating felt ring prevents the escape of hot gases between the propellant container 12 and the motor casing 11. The container 12 slides within the steel casing 11 on the guides 17, until the stops 18 are contacted. These stops automatically limit the movement of the casing 11 to the rate of creep at which the container 12 is consumed. This simple mechanism adjusts $F_s$ and $U_s$ to the proper value. The expansion cone 19 of the nozzle of the motor has a diameter of approximately four feet so that by comparison the rocket has extreme length as compared to the nozzle of the motor. The throat 20 of the nozzle is provided with a refractory lining 21.

One of the fundamental concepts in the autophage is the consumption of the propellant container as the propellant is consumed. The incremental action in the consumption of the container greatly increases the performance obtainable. This increase stems from the improvement of the mass ratio attainable, the avoidance of lifting unnecessary mass and the use of the container mass to augment the jet thrust. If the container material is chemically inert, then its contribution to increasing the thrust is due purely to the mass added to the flow of the exhaust jet, and if the available energy of the jet is assumed to be evenly distributed over all of the mass flowing, including the inert container mass, then a significant thrust gain may be calculated. This gain is due to the larger momentum resulting from imparting to the larger mass the same kinetic energy as that of the smaller mass.

If the container material contributes to the heat released in the combustion chamber, then it may be considered as part of the propellant load. Such an autophage approaches the ideal rocket, for with a combustible container, practically the entire initial mass of the vehicle consists of propellant and payload.

The autophage has certain special features, such as the very high accelerations possible which are sometimes very desirable. Also, the use of the same motor for a number of vehicles of different ranges can be accomplished by changing the length of the propellant tank. Sectional propellant containers allowing the assembling of vehicles of whatever performance the occasion demands are within the concept of the invention. Perhaps the most easily attainable advantage of the autophage is due to the possibility of ruggedizing missiles at little or no performance penalty which facilitates handling in transportation. The stronger tanks make prepacked liquid propellants more feasible and greatly decrease missile cost by allowing generous safety factors in design and thus relaxing the manufacturing and quality control requirements.

In operation, when the motor has been advancing on the propellant container at a steady rate and the burning has been proceeding, then physically what occurs is that the acceleration is increasing as the total mass of the vehicle decreases, and a greater and greater net force is then needed to accelerate the motor section, as its mass is constant. At the same time, the forward mass, which is continually decreasing, requires less and less force for the same acceleration. Eventually, when the frictionally or mechanically transmitted force $F_s$ in direction of thrust and acting between the forward and after sections drops to zero, all of the thrust acting on the motor is being used to accelerate the after mass and no portion of this force remains for transmission by the motor structure to the forward section. Beyond this instant, the motor is unable to advance any further on the rocket container. The after section then drops behind and the two parts of the vehicle separate, terminating the thrust. At this point, there should be no propellant left in the forward section, because if there is, inertial pumping cannot introduce it into the chamber. What ever portion of the forward mass is left should consist solely of the gross payload mass which includes the warhead or net payload and whatever guidance equipment is carried in the forward section.

Competent authority indicates a free space-terminal velocity of 42,500 feet per second is necessary to escape from the earth with no return. This should be contrasted with the velocity of 36,700 feet per second which is theoretically sufficient, in the absence of losses. According to calculations in connection with the autophage, escape could be realized by a single stage missile with a propellant column only 60 feet long using available propellants and carrying a substantial gross-payload. Thus the autophage's superiority over conventional rockets is indicated by reason of not having to lift an empty propellant casing. It is also shown that the burnout fraction is about 2.5% of the initial weight, .5% of which is contributed by the weight of the after section structure. The remaining 2% is taken up by the gross payload which constitutes most of the weight lifted. It is estimated that one-half or at least a fourth of this gross payload may be devoted to the net payload. With this assumption, the mass ratio in terms of the net payload lies between one hundred and two hundred. This value should be compared with the corresponding values of 4000 necessary for launching Explorer No. 1 and over 5000 for Vanguard.

One possible application of the autophage is as an ICBM powerplant. It is estimated that a capability adequate for this purpose is indicated by a 25,000 to 26,000 feet per second free space terminal velocity. Calculations show powerplants exceeding this capability of a wide range of the independent variable and these powerplants are substantially smaller than the present ICBM's. For ICBM use, it may be desirable to retain the after section attached to the warhead throughout the missile's trajectory.

Another use of the autophage is in the anti-ICBM missile field. For this purpose it is assumed that a two stage autophage would be used, but these stages would not necessarily carry minimum payloads. With two stage-missiles of reasonable over-all initial weight, high acceleration, and high terminal speeds seem adequate. These speeds could be much superior to those of the attacking ICBM, thereby permitting a tail chase with trajectory corrections up to interception. This kind of operation, because of the consequent reduction in the demands imposed on the ground-based acquisition radars and other homing and guidance equipment, indicates that it may be possible to develop a complete antimissile-missile system at a low over-all cost. The development difficulties and the enormous expense involved in producing anti-ICBM systems are precisely in the area of homing and guidance where the problems are greatly increased by the limited powerplant performance now available. Presumably the autophage system could effect interception near the mid-portion of the attacking ICBM trajectories and thus provide continental defense at points far removed from American home defenses.

The all inertial solid propellant autophage requires complex burning surfaces, rather than the simple end-burning surfaces generally used, to achieve rapid burning of the propellant. These surfaces must be so constructed as to burn in such a way as to advance into the propellant container without significantly altering the burning surface geometry. These combustion difficulties are peculiar only to the all inertial solid propellant autophage and not to autophage powerplants in general. This burning surface problem does not arise with the liquid-propellant autophages, which employ auxiliary powerplants to assist with the pumping. Such autophages do not need the high burning rate of the propellant, the great tank length, or the high accelerations of the all-inertial solid propellant autophage.

A great many different types of pure autophages are possible, and also hybrid combinations with other powerplants may be devised. The new concept permits a versatility in design, or in power source which is at least as great as that afforded by other propulsive powerplants. Solid, solid-solid, liquid, liquid-liquid, liquid-solid, etc. propellant combinations appear practical. The use of the autophage with an atomic power source seems very probable since the autophage offers certain favorable features that may well prove to be crucial to the practical utilization of this type of power for motion at very high speeds.

If high performance is not mandatory, some of the requirements of the autophage herein described can be less stringent. Thus, a heavier after section and a shorter over-all vehicle length are possible assuming payloads greater than the minimum. For these vehicles of modest performance, the autophage can also offer certain advantages. The relative insensitiveness of the autophage performance to the tankage weight permits generous safety factors in the tank design, and the autophage would therefore have greater structural strength than the conventional missile, making it easier to handle and more adaptable to filed use. The increased safety factor would also diminish the quality control now needed in the manufacture of rocket missiles, thereby reducing cost and greatly improving reliability.

Having described this invention and some of its practical applications, what is claimed is:

1. A rocket assembly comprising a cylindrical motor casing having a nozzle at one end and open at the other end, a stop member within the casing and affixed thereto at the throat of the nozzle, a cylindrical consumable container having a nose cone at one end and open at the other end, said container slidable within the casing member with the open end facing the nozzle and the movement therein limited by said stop member, said container after ignition adapted to be consumed progressively to add to the thrust as the propellant is emptied and the motor casing forced by the inertia of the rocket in flight to ride up on the propellant container as it is consumed to reduce the non-productive weight of the rocket.

2. A rocket assembly comprising a cylindrical motor casing having a nozzle at one end and open at the other end, a stop member within the casing and affixed thereto at the throat of the nozzle, a cylindrical consumable propellant container having a nose cone at one end and open at the other end, said container slidable within the casing member with the open end facing the nozzle and the rearward movement therein limited by said stop member, the motor casing forced by the inertia of the rocket in flight to ride up on the propellant container as it is consumed to reduce the non-productive weight of the rocket and said motor casing free to separate from the nose cone by the slidable connection therewith when the motor is no longer capable of imparting any thrust to the nose cone.

3. The method of operating a rocket having a motor with a combustion chamber to reduce the ratio of overall load to payload comprising, igniting the propellant of the rocket, utilizing in flight the inertial reaction of the structure forward of the motor to develop the excess force necessary to move the propellant and consumable container rearward, feeding the said propellant and container to the combustion chamber by this force, consuming continually the emptied portion of the propellant container to augment the overall thrust and reduce the load, and controlling the forward movement of the rocket motor on the rearward movement of the propellant container to maintain the combustion chamber at constant volume.

4. The method of operating a rocket having a motor with a combustion chamber to reduce the ratio of overall load to payload comprising, igniting the propellant of the rocket, causing the propellant and its consumable container to be fed by inertial pumping rearward into the motor by the sliding relation therebetween, consuming continually the emptied portion of the propellant container to augment the overall thrust and reduce the load, controlling the forward movement of the rocket motor on the rearward movement of the propellant container to maintain the combustion chamber at constant volume and separating the motor casing from the rocket by the slidable relation therewith when the motor is no longer capable of imparting any thrust to the rocket.

References Cited by the Examiner

UNITED STATES PATENTS

| | | | |
|---|---|---|---|
| 2,114,214 | 4/1938 | Damblanc | 102—34.5 |
| 2,700,337 | 1/1955 | Cumming | 102—49 |
| 2,703,960 | 3/1955 | Prentiss | 60—35.6 |
| 2,870,599 | 1/1959 | Long | 60—35.6 |
| 2,909,032 | 10/1959 | Daries | 60—35.6 |
| 2,987,881 | 6/1961 | Mullane | 102—49 X |

BENJAMIN A. BORCHELT, *Primary Examiner.*

SAMUEL BOYD, SAMUEL FEINBERG, *Examiners.*

D. H. WARD, L. L. HALLACHER, V. R. PENDEGRASS, *Assistant Examiners.*